US012804349B2

(12) United States Patent
Han et al.

(10) Patent No.: US 12,804,349 B2
(45) Date of Patent: Nov. 17, 2026

(54) SYSTEM AND METHOD FOR A MOBILE COMMUNICATION DEVICE

(71) Applicant: GM GLOBAL TECHNOLOGY OPERATIONS LLC, Detroit, MI (US)

(72) Inventors: Zijun Han, Madison Heights, MI (US); Jinzhu Chen, Troy, MI (US); Fan Bai, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 188 days.

(21) Appl. No.: 18/947,177

(22) Filed: Nov. 14, 2024

(65) Prior Publication Data

US 2026/0136155 A1 May 14, 2026

(51) Int. Cl.
*H04W 4/021* (2018.01)
*H04W 4/40* (2018.01)

(52) U.S. Cl.
CPC ............. *H04W 4/021* (2013.01); *H04W 4/40* (2018.02)

(58) Field of Classification Search
CPC ....... H04W 4/021; H04W 4/40; H04W 4/023; H04W 4/38; H04W 64/00; G01S 5/02; G01C 21/00; G01C 21/20; H04B 1/71632
See application file for complete search history.

(56) References Cited

U.S. PATENT DOCUMENTS 11,832,208 B2 * 11/2023 Henry .................... H04W 64/00
11,914,064 B2 * 2/2024 Vaccariello ........... G01S 5/0244

FOREIGN PATENT DOCUMENTS

DE 102022101592 A1 7/2022

* cited by examiner

*Primary Examiner* — Kabir A Timory
(74) *Attorney, Agent, or Firm* — Quinn IP Law

(57) ABSTRACT

A localization system for a mobile device includes a plurality of ultra-wideband (UWB) sensors affixed on a platform; and a controller. The controller includes algorithmic code that is executable to: determine a localization dataset between the plurality of UWB sensors and the mobile device; execute an end-to-end machine learning-based localization routine to determine a first location estimate; execute a hybrid two-stage full-space localization routine to determine a second location estimate; determine a spatial location for the mobile device in relation to the controller based upon the first and second location estimates. Interaction between the mobile device and the platform is controlled via the controller based upon a proximity of the mobile device to the platform based upon one of the first location estimate and the second location estimate for the mobile device.

20 Claims, 8 Drawing Sheets

SYSTEM AND METHOD FOR A MOBILE COMMUNICATION DEVICE

INTRODUCTION

The present disclosure generally relates to localization systems for portable or wireless communication devices, e.g., cell phones or tablets, and more particularly relates to systems and methods for mobile device localization using ultra-wideband (UWB) signals.

Mobile devices provide driver-assist features and driverless features. For these features to operate reliably, an awareness of the location and context of the mobile device is required. Additionally, many onboard systems require being supplied with the location of the mobile platform for security and other purposes.

Localization systems for mobile devices include systems in which the position of one or more objects are determined. Existing vehicle location systems for mobile device(s) experience accuracy challenges in three-dimensional space. Furthermore, communication latency and sensor dependence may cause inefficient localization solutions in tracking a mobile device either in-vehicle or proximal to the vehicle. Furthermore, angle-of-arrival techniques may introduce communication and other issues where viewing angle restrictions are present.

Ultra-wideband (UWB) is a technology that uses a high signal bandwidth, in particular for transmitting digital data over a wide spectrum of frequency bands at low power levels. For example, ultra-wideband technology may use the frequency spectrum of 3.1 to 10.6 GHz and may feature a high frequency bandwidth of more than 500 MHz and very short pulse signals, resulting in high data rates. The UWB technology enables a high data throughput for communication devices and a high precision for localization of mobile devices. For this reason, localization systems often make use of UWB technology. However, known UWB-based localization systems may not be capable of accurately determining the position of an object under varying conditions and circumstances.

Improved systems and methods for mobile platform localization are desired.

SUMMARY

The following disclosure provides a technological solution to the above technical problems, in addition to addressing related issues. The concepts described herein provide one of, or combinations of, a method, apparatus, and system for localization of a mobile platform, wherein localization refers to determining a specific geo-physical location of a mobile platform such as a mobile device, and wherein a mobile device may include a mobile phone, a tablet, a navigation system, etc., without limitation.

An aspect of the disclosure may include a localization system for a mobile device, which includes a plurality of ultra-wideband (UWB) sensors affixed on a platform; and a controller, wherein the controller is communicatively coupled to the plurality of UWB sensors. The controller includes algorithmic code that is executable to: determine a localization dataset between the plurality of UWB sensors and the mobile device; execute an end-to-end machine learning-based localization routine based upon the localization dataset to determine a first location estimate for the mobile device; execute a hybrid two-stage full-space localization routine based upon the localization dataset to determine a second location estimate for the mobile device; determine a spatial location for the mobile device in relation to the controller based upon the first location estimate for the mobile device and the second location estimate for the mobile device. Interaction between the mobile device and the platform is controlled via the controller based upon a proximity of the mobile device to the platform, wherein the proximity is determined based upon one of the first location estimate and the second location estimate for the mobile device.

Another aspect of the disclosure may include the end-to-end machine learning-based localization routine having a backbone encoder composed with a Siamese network to encode the localization dataset into a consistent feature map; and a feedforward layer arranged to determine the first location estimate for the mobile device based upon the consistent feature map.

Another aspect of the disclosure may include employing the Siamese network to train the backbone encoder based upon a contrastive loss, wherein the contrastive loss is determined between a first scenario and a second scenario that are input to the Siamese network.

Another aspect of the disclosure may include the hybrid two-stage full-space localization routine including a non-line of sight (NLOS) detection algorithm, a signal restoration algorithm, and a trilateration algorithm that are executable to determine the second location estimate for the mobile device.

Another aspect of the disclosure may include the hybrid two-stage full-space localization routine executing when the non-line of sight (NLOS) detection algorithm detects presence of an obstacle between one of the plurality of UWB sensors and the mobile device.

Another aspect of the disclosure may include the signal restoration algorithm including a multi-variant signal restoration routine that is executable to generate a restored localization dataset based upon a spatial evaluation and a temporal evaluation of the localization dataset.

Another aspect of the disclosure may include the trilateration algorithm being executable to determine the second location estimate for the mobile device based upon the restored localization dataset.

Another aspect of the disclosure may include the hybrid two-stage full-space localization routine further including a triangulation algorithm, wherein the triangulation algorithm is executable to determine the second location estimate for the mobile device based upon the restored localization dataset.

Another aspect of the disclosure may include the platform being a mobile platform.

Another aspect of the disclosure may include a localization system for a mobile device, which includes a plurality of ultra-wideband (UWB) sensors affixed on a platform, and a controller, wherein the controller is communicatively coupled to the plurality of UWB sensors. The controller has algorithmic code that is executable to: determine a localization dataset between the mobile device and the plurality of UWB sensors; execute a first localization routine to determine a first location estimate for the mobile device based upon the localization dataset; and execute a second localization routine to determine a second location estimate for the mobile device based upon the localization dataset, wherein the second localization routine includes a non-line of site (NLOS) detection routine, a signal restoration routine, and a trilateration algorithm that are executable to determine the second location estimate for the mobile device. A spatial location for the mobile device is determined in relation to the controller based upon the first location estimate for the mobile device and the second location estimate for the mobile device; and interaction between the mobile device and the platform is controlled via the controller, based upon a proximity of the mobile device to the platform, wherein the proximity is determined based upon one of the first location estimate and the second location estimate for the mobile device.

Another aspect of the disclosure may include a localization system for a platform, including a plurality of ultra-wideband (UWB) sensors affixed on the platform; a controller, wherein the controller is communicatively coupled to the plurality of UWB sensors; and algorithmic code, wherein the algorithmic code includes a first localization routine and a second localization routine. The controller is arranged to execute the algorithmic code, wherein the algorithmic code is executable to: determine a localization dataset between a mobile device and the plurality of UWB sensors; execute the first localization routine to determine a first location estimate for the mobile device based upon the localization dataset; execute the second localization routine to determine a second location estimate for the mobile device based upon the localization dataset, wherein the second localization routine includes a non-line of site (NLOS) detection routine, a signal restoration routine, and a trilateration algorithm that are executable to determine the second location estimate for the mobile device; determine a spatial location for the mobile device on the platform; and control interaction between the mobile device and the platform via the controller, based upon a proximity of the mobile device to the platform, wherein the proximity is determined based upon one of the first location estimate and the second location estimate for the mobile device.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
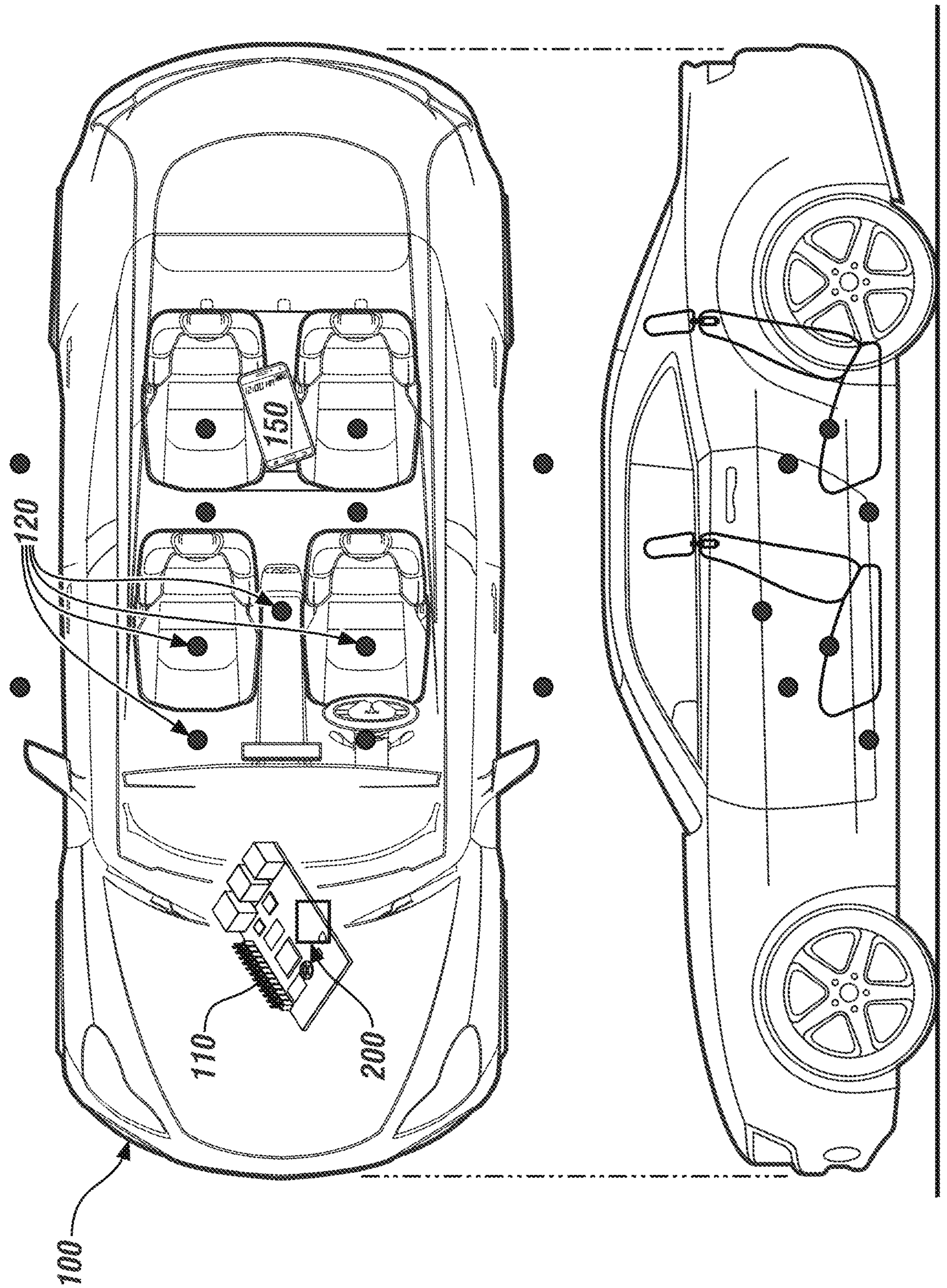
FIG. 1 schematically illustrates a mobile device disposed within a platform having a plurality of ultra-wideband (UWB) sensors affixed thereto and a controller, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

The following detailed description is merely exemplary in nature and is not intended to limit the application and uses. Furthermore, there is no intention to be bound by expressed or implied theories presented in the preceding technical field, background, brief summary or the following detailed description. Throughout the drawings, corresponding reference numerals indicate like or corresponding parts and features.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality. Furthermore, embodiments may be described herein in terms of functional and/or logical block components and various processing steps. Such block components may be realized by combinations or collections of mechanical and electrical hardware, software, and/or firmware components configured to perform the specified functions. For example, an embodiment may employ various combinations of mechanical components and electrical components, integrated circuit components, memory elements, digital signal processing elements, logic elements, look-up tables, or the like, which may carry out a variety of functions under the control of one or more microprocessors or other control devices. In addition, those skilled in the art will appreciate that certain embodiments may be practiced in conjunction with mechanical and/or electronic systems, and that the systems described herein are merely embodiments of possible implementations.

The use of ordinals such as first, second and third does not necessarily imply a ranked sense of order, but rather may only distinguish between multiple instances of an act or structure.

Unless otherwise defined, all technical and scientific terms used in this specification have the same meanings as commonly understood by those skilled in the art to which the present disclosure pertains. The terms used in this specification are intended only for describing specific implementations, and are non-limiting. As used in this specification, the term "and/or" includes combinations of one or more associated listed items.

Referring now to the drawings, wherein the depictions are for the purpose of illustrating certain embodiments only and not for the purpose of limiting the same, 150 schematically illustrates a mobile device 150 that is disposed within a platform 100, wherein the platform 100 has a plurality of ultra-wideband (UWB) sensors 120 affixed thereto, and a controller 110. The controller 110 is in communication with the UWB sensors 120, and includes a localization system 200, wherein the localization system 200 is operative to locate the mobile device 150 when the mobile device 150 is within or proximal to the platform 100.

As employed herein, the term "mobile device", e.g., mobile device 150, refers to a portable or wireless communication device, such as a cell phone, tablet, etc., without limitation.

The concepts described herein relate to systems and methods for localization of the mobile device 150 in relation to the platform 100 employing ultra-wideband (UWB) signals.

In one embodiment, the platform 100 is a mobile platform that is in the form of a vehicle. The vehicle 100 may include, but not be limited to a mobile platform in the form of a commercial vehicle, industrial vehicle, agricultural vehicle, passenger vehicle, aircraft, watercraft, train, all-terrain vehicle, personal movement apparatus, drone, robot and the like to accomplish the purposes of this disclosure. As is understood, the vehicle 100 may embody a body, chassis, and wheels, each of which may be rotationally coupled to the chassis near a respective corner of the body. The vehicle 100 may be autonomous or semi-autonomous. The vehicle 100 includes systems for vehicle operation, such as a propulsion system, a transmission system, a steering system, actuators for the wheels (traction control), and a brake system, and generates a variety of signals, including vehicle speed and vehicle acceleration.

Elements of the localization system 200 may be implemented as algorithmic code that is executed in the controller 110. It is appreciated that the algorithmic code associated with the localization system 200 may be embedded in and executed by the controller 110 in one embodiment. Alternatively, a portion of the algorithmic code associated with the localization system 200 may be embedded in and executed by a second controller (not shown) in one embodiment. In one embodiment, the second controller that executes a portion of the algorithmic code associated with the localization system 200 may be cloud-based. Other elements of the localization system 200 may be implemented as one or more of a controller, an application specific integrated circuit (ASIC), a field programmable gate array (FPGA), a programmable logic device, a combinational logic circuit including discrete gates or transistor logic, discrete hardware components and memory devices, and/or combinations thereof, and is designed to perform the functions described herein.

The controller 110 may be communicatively coupled to one or multiple vehicle systems, including, e.g., a navigation system, an infotainment system, a communication system, a GPS/GNSS system, a spatial monitoring system, cabin environmental controls system, etc., without limitation.

The ultra-wideband (UWB) sensors 120 are affixed to the platform 100 at various discrete, separate locations, and are communicatively connected to the controller 110.

The plurality of UWB sensors 120 are configured to sense, or receive, UWB transmissions from UWB beacons, which may originate from the mobile device 150.

Figure 2:
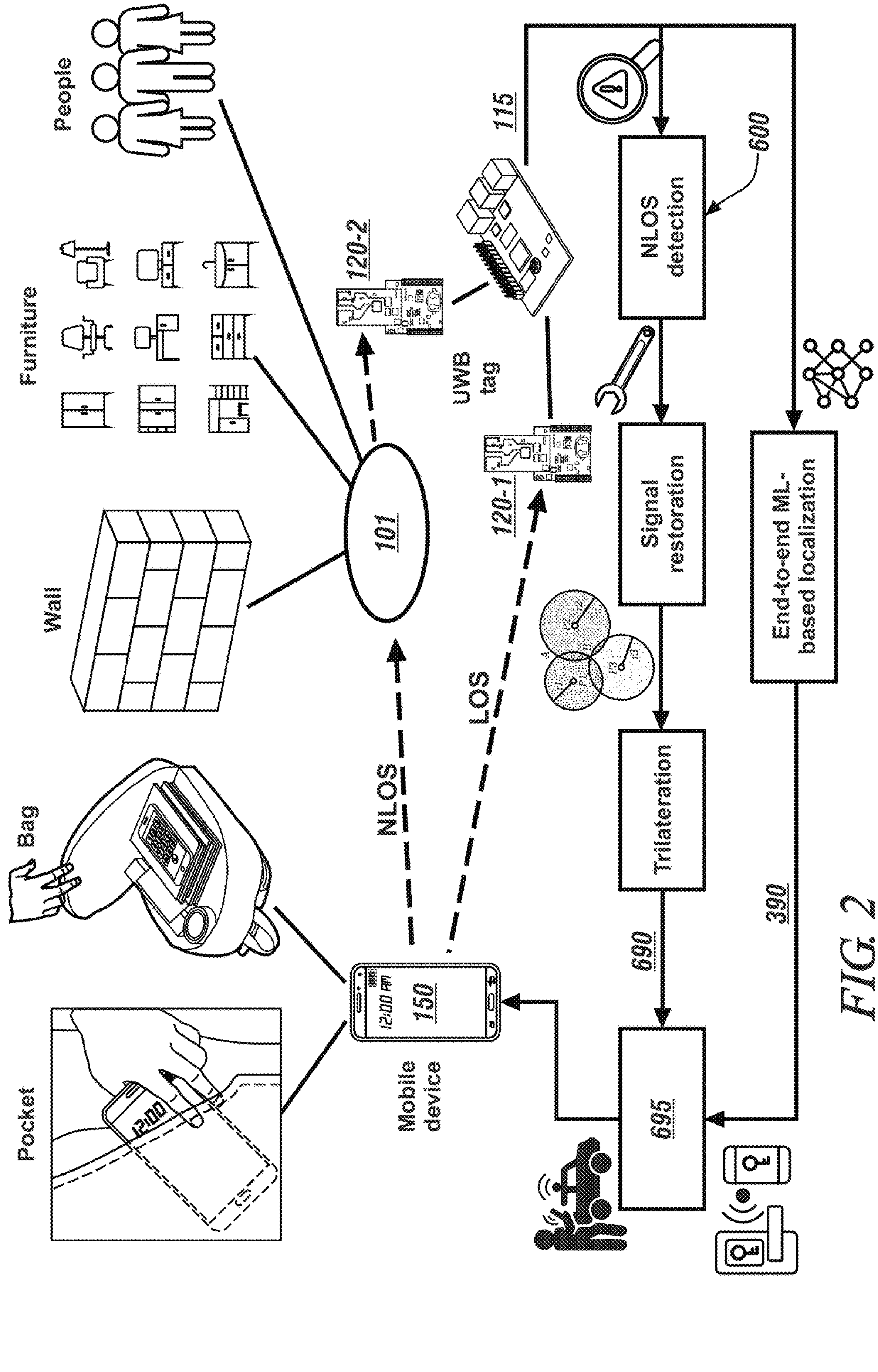
FIG. 2 illustrates elements of an embodiment of a localization system for a mobile device, in accordance with the disclosure.

Turning now to FIG. 2, and with continued reference to FIG. 1, the plurality of UWB sensors 120 may be mounted on the mobile platform 100, including a first UWB sensor 120-1 and a second UWB sensor 120-2, and controller 110 configured to execute the localization system 200. The first UWB sensor 120-1 may be coplanar with the second UWB sensor 120-2 (as shown), although in practice they may each have a third dimension. In an initialization step, the localization system 200 may perform a handshake with each of the UWB sensors to discover specifications of the three UWB sensors and assign coordinates thereto for future operations.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either “1” or “0”, or can be infinitely variable in value.

Referring again to FIG. 2, elements of an embodiment of the localization system 200 for mobile device 150 are shown, including first UWB sensor 120-1, second UWB sensor 120-2, localization controller 110, and mobile device 150. The first and second UWB sensors 120-1, 120-2 may be a subset of the plurality of UWB sensors 120 that are described in FIG. 1 within vehicle 100.

The first UWB sensor 120-1 is depicted as having an uninterrupted line of sight (LOS) with the mobile device 150, and the second UWB sensor 120-2 is depicted as having a non-line of sight (NLOS) with the mobile device 150 due to presence of an obstacle 101 that may obstruct or otherwise interfere with UWB signal transmission between the mobile device 150 and the respective UWB sensor 120, e.g., UWB sensor 120-1 UWB sensor 120-1 in this embodiment. The obstacle 101 may be in the form of a pocket in clothing, a handbag, a fixture such as a wall, a piece of furniture, one or multiple people, etc.

The first and second UWB sensors 120-1, 120-2 are in communication with the controller 110.

The controller 110 includes a plurality of executable routines for monitoring localization dataset 115 between the mobile device 150 and each of the plurality of UWB sensors, e.g., 120-1 and 120-2. The localization dataset 115 includes parametric features for each of the plurality of UWB sensors 120-1, 120-2, with such parameters including a Time of Arrival (ToA) and an Angle of Arrival (AoA) for a radio signal. The ToA represents an absolute time instant when a radio signal emanating from a transmitter on the mobile device 150 is received on one of the UWB sensors 120. The AoA represents an angle of the radio signal emanating from the transmitter on the mobile device 150 and the receiver on one of the UWB sensors 120. The localization dataset 115 is captured as an array of datapoints representing the aforementioned parameters, examples of which are described with reference to FIG. 3, et. seq.

One of the executable routines is an end-to-end machine learning-based localization routine 300 for determining a fingerprint or first location estimate 390 for the mobile device based upon the localization dataset 115.

One of the executable routines is a hybrid two-stage full-space localization routine 600 for determining a fine-grain or second location estimate 690 for the mobile device 150 based upon the localization dataset 115.

A localization-based service 695 employs the spatial location (x,y,z), i.e., one of or both of the first location estimate 390 and the second location estimate 690 for the mobile device 150 based upon the first location estimate 390 for the mobile device 150 and the second location estimate 690 for the mobile device 150. This may include, in one embodiment, permitting or denying access to the mobile platform 100 based upon proximity of the mobile device 150 to the mobile platform 100, wherein the proximity is determined based upon one of or both of the first location estimate 390 and the second location estimate 690 for the mobile device 150.

In this manner, the controller 110 is able to control interaction(s) between the mobile device 150 and the platform 100 based upon a proximity of the mobile device 150 to the platform 100, wherein the proximity is determined based upon either or both of the first location estimate 390 and the second location estimate 690 for the mobile device 150 in relation to the platform 100.

The localization dataset 115 (ToA, AoA) between the mobile device 150 and the plurality of UWB sensors 120 on the platform 100 may be employed by the localization system 200 to determine the spatial location (x,y,z) of the mobile device 150 in relation to the platform 100, and thus permit or deny execution of one or more of a plurality of applications associated with the localization-based service 695. The plurality of applications may operate to control vehicle access, vehicle operation (e.g., engine starting), keyless entry, navigation, advanced driver assistance (ADAS), etc.

Figure 3:
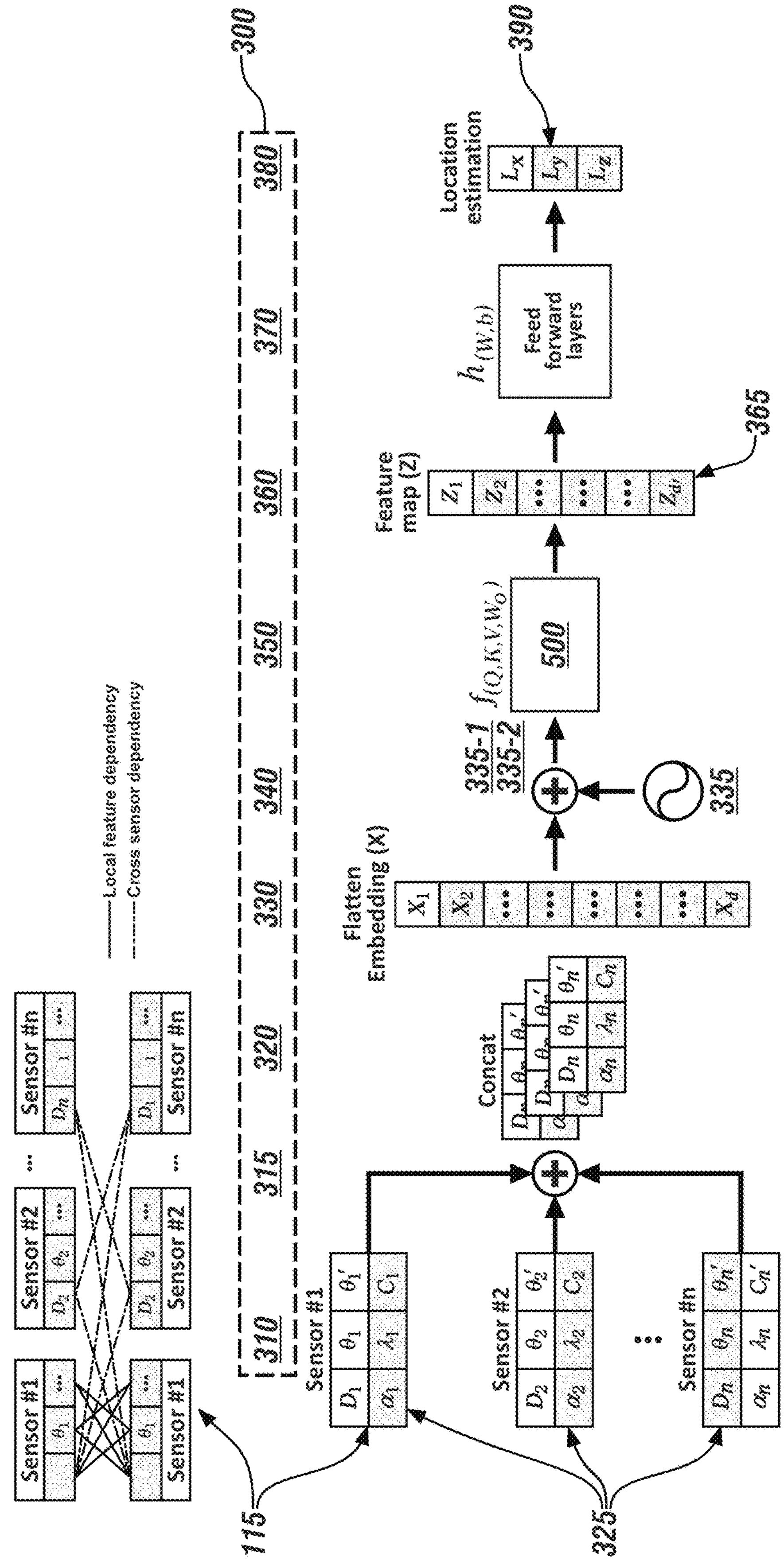
FIGS. 3 and 4 schematically illustrate details related to an end-to-end machine learning-based localization routine for determining a first location estimate for an embodiment of a mobile device, in accordance with the disclosure.
Figure 4:
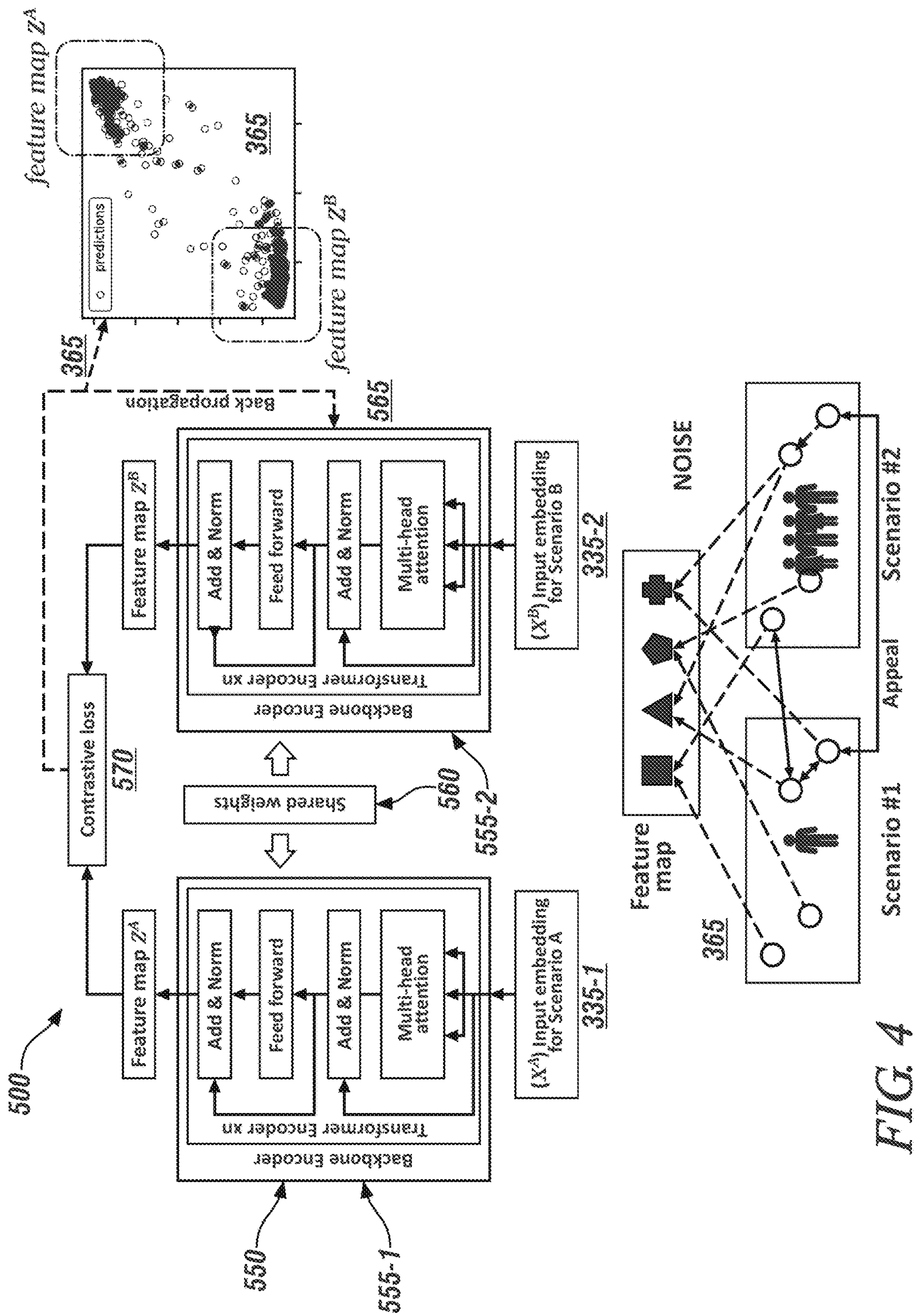

FIGS. 3 and 4 schematically illustrate, with continued reference to elements of FIGS. 1 and 2, details related to the end-to-end machine learning-based localization routine 300 for determining the fingerprint or first location estimate 390 for the mobile device 150 based upon the localization dataset 115.

As illustrated with reference to FIG. 3, the localization dataset 115 (ToA, AoA) between the mobile device 150 and each of the plurality of UWB sensors (Sensor #1, Sensor #2, . . . , Sensor #n) 120 is depicted as a plurality of sensor-specific feature arrays 325 (Step 310). The plurality of sensor-specific feature arrays 325 are combined (step 315), concatenated (Step 320), and flattened to form a 1-dimensional array (Step 330). Positional encoding 335 is added to the 1-dimensional array 325 to enable identification of individual ones of the plurality of UWB sensors within the 1-dimensional array 325, with a first position encoding 335-1 being associated with Sensor #1, a second position encoding 335-2 being associated with Sensor #2, etc. (Step 340). The 1-dimensional array 325 is input to a backbone encoder 500 (Step 350), which generates a feature map (Z) 365 (Step 360). The feature map (Z) 365 is provided to a feedforward layer function (Step 370), which generates an estimate of the location in the form of the first location estimate ($L_x$, $L_y$, $L_z$) 390 for the mobile device (Step 380). With the supervised locator, the feedforward layers provide the estimated location (x, y, z) of the mobile device 150 based on the encoded feature map. Details of the operation of the backbone encoder (Step 350) are described with reference to FIG. 4.

FIG. 4 schematically illustrates details related to an embodiment of the backbone encoder 500 that is utilized in the end-to-end machine learning-based localization routine 300 using selected portions from the 1-dimensional array 325, which are depicted as Scenario A 335-1 and Scenario B 335-2. The backbone encoder 500 employs a Siamese network 550 and a contrastive loss routine 570 with a back-propagation element 565 to encode the raw measurements of the portions of the 1-dimensional array 325 into a consistent feature map without regard to presence of dynamic noise. The Siamese network 550 includes a first backbone encoder 555-1 and a second backbone encoder 555-2, with shared weights 560.

The backbone encoder 500 is designed with a multi-head attention mechanism to consider the dependencies among the different features, e.g., Scenario A 335-1 and Scenario B 335-2, which originate from the localization dataset 115 (ToA, AoA), and also consider communication delays or latencies, across the plurality of UWB sensors 120.

When placing the target at location L, given a hybrid feature map in the form of a portion of the 1-dimensional array 325 as $X=(X_1, X_2, \ldots, X_d)\in Rd$, where d is the dimension of the inputs, a corrupted version of X is defined as Xe=X+E and E is the noise factor. Both the baseline measurement X and the corrupted input Xe are passed through the backbone encoder $f(Q,K,V_i,W_0)$ to obtain a noise representation Z and Ze of dimension d' in accordance with the following equations:

$$Z = f_{(Q,V,K,W)}(X) = Concat\left(\text{softmax}\left(\frac{XQ_iK_i^T}{\sqrt{d}}\right)V_i\right)W_O \quad [1]$$

$$\tilde{Z} = f_{(Q,V,K,W_O)}(\tilde{X}) = Concat\left(\text{softmax}\left(\frac{\tilde{X}Q_iK_i^T}{\sqrt{d}}\right)V_i\right)W_O \quad [2]$$

Contrastive loss refers to a loss function that may be employed to learn cross-modal embeddings by comparing the similarity or dissimilarity of vectors, e.g., similarity or dissimilarity of Scenario A 335-1 and Scenario B 335-2. The contrastive loss routine 570 operates according to the following relationship to determine loss $l_s$, which is defined and determined as follows:

$$ł_S = \sum_{i=1}^{d'} \left(\left|Z_i - \tilde{Z}_j + \epsilon\right|^{\mathcal{P}}\right)^{\frac{1}{p}} \quad [3]$$

A Siamese network 550, also called a twin network, is trained by comparing output features (Feature map $Z^A$, Feature map $Z^B$) of two or more inputs that have been encoded. Comparison may be via triplet loss, pseudo labeling with cross-entropy loss, or contrastive loss.

The Siamese network 550 is often shown as two different encoding networks that share weights for purposes of illustration. When reduced to executable algorithmic code, the Siamese network 550 may be in the form of a single algorithm that is executed twice.

As shown, the Siamese network 550 is used to train the backbone encoder 500 in the Transformer. The benefit of using the Siamese network 550 is that it does not need to know an exact ground truth, such as exact location. Instead, the Siamese network 550 only needs to know if two locations are the same or different. Therefore, a simple detection (by inertial sensors, etc.) may be employed to tell if sensor readings belong to same or different locations, enabling online training under different environmental conditions.

The contrastive loss routine 570 takes the output of the network for a positive example and calculates its distance to an example of the same class and contrasts that with the distance to negative examples. Said another way, the loss is low if positive samples are encoded to similar (closer) representations and negative examples are encoded to different (farther) representations. This is accomplished by taking the cosine distances of the vectors and treating the resulting distances as prediction probabilities from a typical categorization network. The distance of the positive example and the distance of the negative example may be represented as output probabilities using a cross-entropy loss. When performing supervised categorization, the network outputs may be run through a softmax function to determine a negative log-likelihood loss. Contrastive loss can be implemented as a modified version of the cross-entropy loss. Contrastive loss, like triplet and magnet loss, is used to map vectors that model the similarity of input items. These mappings can support many tasks, like unsupervised learning, one-shot learning, and other distance metric learning tasks.

The backbone encoder 500 generates feature map (Z) 365, which indicates a likelihood of whether Scenario A 335-1 is collocated with Scenario B 335-2. The feature map (Z) 365 is provided to a feedforward layer function (Step 370), which generates the estimate of the location in the form of the first location estimate ($L_x$, $L_y$, $L_z$) 390 for the mobile device (Step 380).

FIGS. 5, 6, 7, and 8 schematically illustrate, with continued reference to elements of FIGS. 1 and 2, elements related to the hybrid two-stage full-space localization routine 600 for determining the second location estimate 690 for the mobile device 150 based upon the localization dataset 115.

Figure 5:
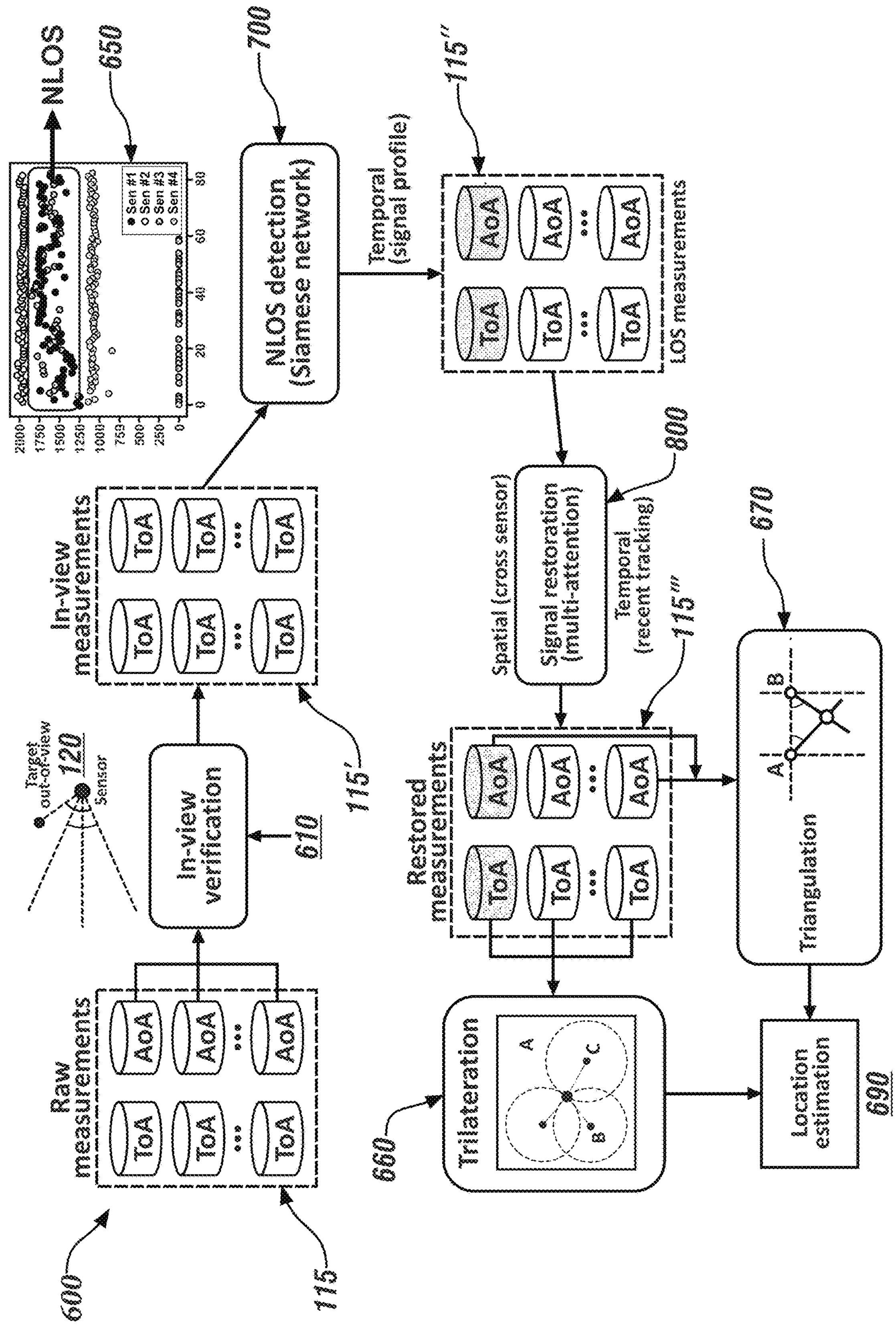
FIG. 5 schematically illustrates a hybrid two-stage full-space localization routine, in accordance with the disclosure.

FIG. 5 schematically illustrates the hybrid two-stage full-space localization routine 600, which includes a non-line-of-sight (NLOS) detection routine 700 (FIG. 6), and a multi-variant signal restoration routine 800 (FIG. 7) that includes a multi-attention signal denoiser routine 900 (FIG. 8), which generates a restored localization dataset 115''' for the localization dataset 115 (ToA, AoA) between the mobile device 150 and the plurality of UWB sensors 120. The restored localization dataset 115''' is input to a trilateration routine 660 and a triangulation routine 670 to effect the second location estimate 690 for the mobile device 150. The output of the NLOS detection routine 700 is graphically illustrated (650).

Referring again to FIG. 5, the plurality of sensor inputs (ToA, AoA) that form the localization dataset 115 is subjected to an in-view verification routine 610 to identify whether the individual features or elements of the localization dataset 115 that correspond to an out-of-view target. A first interim localization dataset 115' is generated thereby, identifying individual features or elements of the localization dataset 115 are associated with an out-of-view target.

The first interim localization dataset 115' is subjected to the NLOS detection routine 700 to identify whether the individual features or elements of the first interim localization dataset 115' correspond to one of the UWB sensors 120 being in a NLOS location. The NLOS detection routine 700 generates a second interim localization dataset 115'', which has individual features or elements of the first localization dataset 115' that identify individual features or elements of the localization dataset 115 that correspond to one of the plurality of UWB sensors 120 being in a NLOS location. This is described herein with reference to FIG. 6.

The second interim localization dataset 115'' is subjected to the multi-variant signal restoration routine 800, which generates a restored localization dataset 115''' based upon a spatial evaluation and a temporal evaluation. The multi-variant signal restoration routine 800 is described herein with reference to FIGS. 7 and 8.

Referring again to FIG. 6, the NLOS detection routine 700 executes to identify whether the individual features or elements of the first interim localization dataset 115' corresponds to one of the UWB sensors 120 being in a NLOS location employing a learning-based Siamese network (SNN) 720. The Siamese network 720 only needs to know if two locations are the same or different. Therefore, a simple detection is done to determine if sensor readings belong to the same location or to different locations.

The inputs 710 include temporal consecutive localization datasets ToA, AoA with a communication delay, and in-view validation data with rolling window.

The learning-based Siamese network 720 is employed to encode the inputs into deeper feature maps Z 730. The SNN 720 is trained with pairs of 1) LOS↔LOS; 2) LOS↔NLOS; 3) NLOS/NLOS data samples, with the results being depicted graphically 740 and in a multi-dimensional array 750. The multi-dimensional array 750 includes a mask (0 or 1) based a temporal evaluation ($t_1$, $t_2$, . . . $t_n$) and a spatial evaluation $S_1$, $S_2$, . . . . $S_m$), wherein the mask indicates a LOS reading (1) or a NLOS reading (0).

Figure 6:
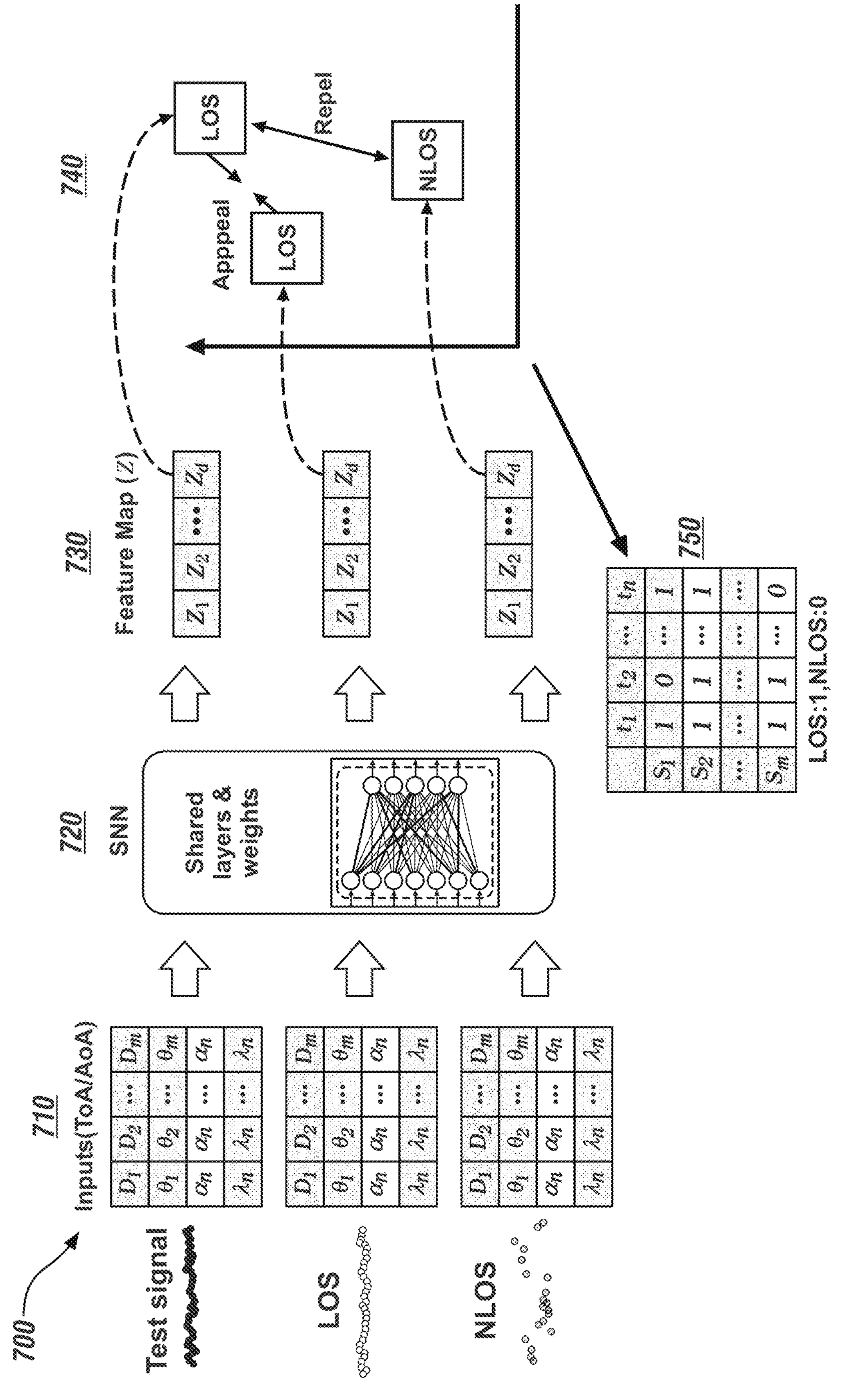
FIG. 6 schematically illustrates a non-line of sight (NLOS) detection routine, in accordance with the disclosure.
Figure 7:
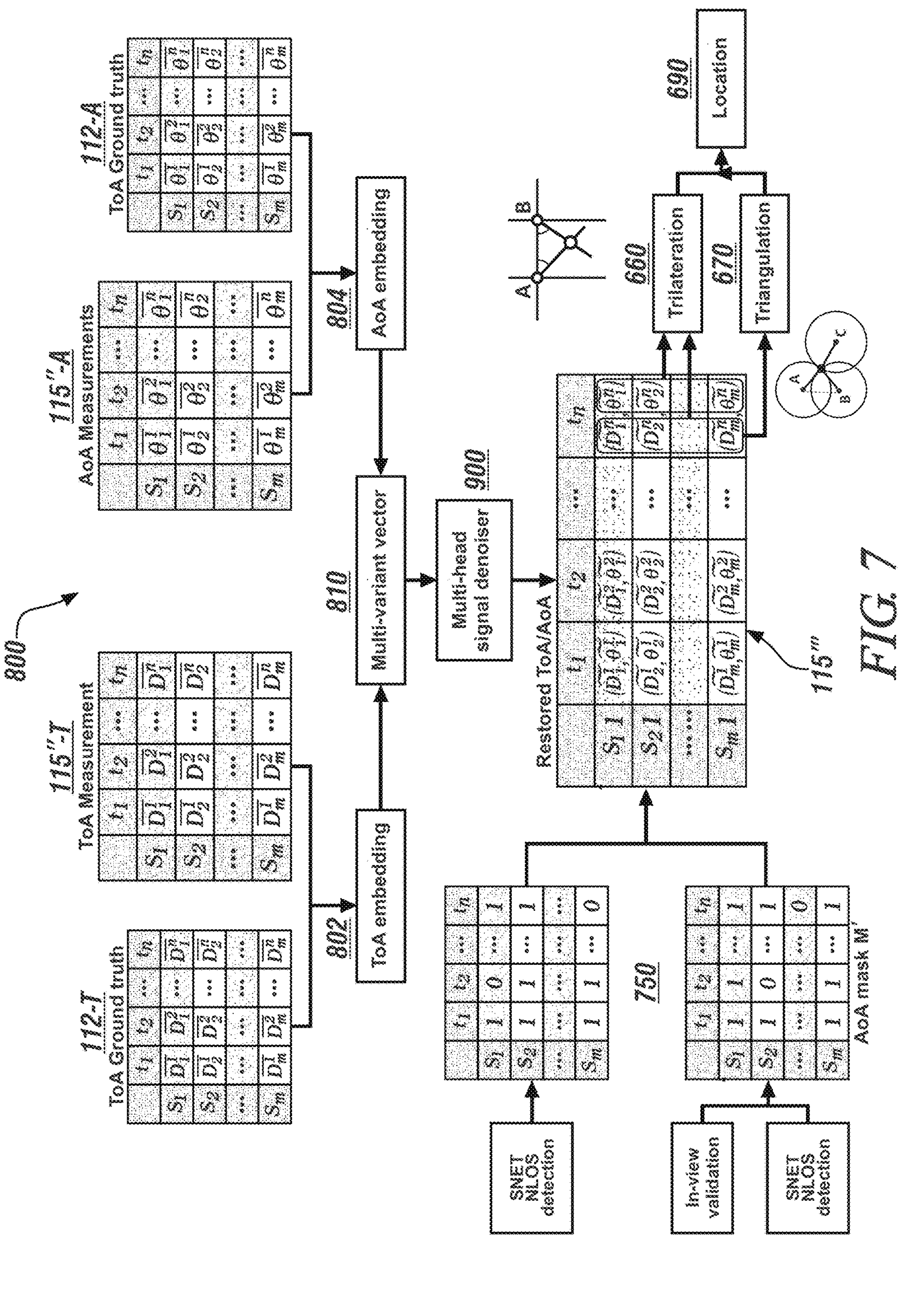
FIG. 7 schematically illustrates a multi-variant signal restoration routine, in accordance with the disclosure.
Figure 8:
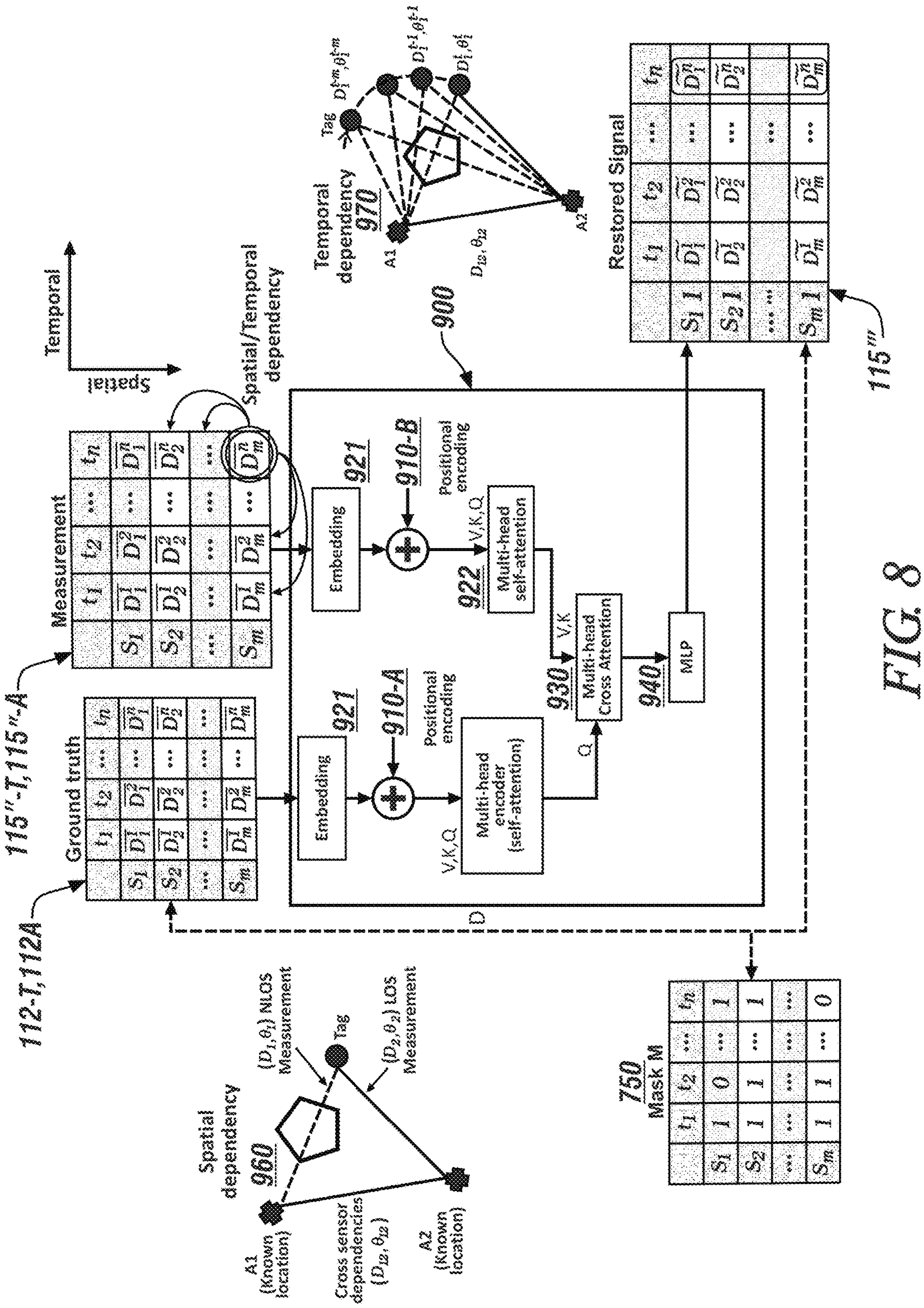
FIG. 8 schematically illustrates a multi-attention signal denoiser routine, in accordance with the disclosure.

Referring again to FIG. 7, the multi-variant signal restoration routine 800 includes the multi-attention signal denoiser routine 900, and generates the restored localization dataset 115''' for the localization dataset 115 (ToA, AoA) between the mobile device 150 and the plurality of UWB sensors 120 based upon the spatial evaluation and the temporal evaluation employing the multi-dimensional array 750 that was created by learning-based Siamese network (SNN) 720 of FIG. 6. The restored localization dataset 115''' is input to the trilateration routine 660 and the triangulation routine 670 to effect the second location estimate 690 for the mobile device 150.

The second interim localization dataset 115'' is separated into a ToA portion 115''-T and AoA portion 115''-A. The ToA portion 115''-T is embedded with a ToA ground truth vector 112-T (802), the AoA portion 115''-A is embedded with a AoA ground truth vector 112-A (804), and are combined to form a multivariant vector (810), which is provided as input to the multi-attention signal denoiser routine 900.

The multi-attention signal denoiser routine 900 generates the restored localization dataset 115''' based upon the multivariant vector 810.

Referring again to FIG. 8, the multi-attention signal denoiser routine 900 employs input from the multivariant vector 810, which includes the ToA portion 115''-T and the AoA portion 115''-A with position encoding 910-A, and the ToA ground truth vector 112-T and AoA ground truth vector 112-A with position encoding 910-B. The ToA ground truth vector 112-T and AoA ground truth vector 112-A are subjected to a first multi-head encoder 921 to form feature Q. The ToA portion 115''-T and the AoA portion 115''-A are subjected to a second multi-head encoder 922 to form features V and K. A multi-head cross attention routine 930 is executed on the features Q, V, K, and subjected to a machine learning element (MLP) 940 to generate the restored localization dataset 115'''.

The multi-attention signal denoiser routine 900 is a Language Translation Inspired (LTI) signal denoise transformer, which provides a precise localization. The signal denoise problem is formulated as a language translation problem to translate the noisy signal to a clean signal. Instead of using enumeration for language word embedding, a novel numeric sensor embedding is designed that works with a newly designed mean-square-error loss function to solve a regression problem for sensor measurement restoration. This enables a real-time detection of a new signal sequence.

As such, the hybrid two-stage full-space localization routine 600 includes a process to detect occurrence of a non-line-of-sight (NLOS) reading in the localization dataset 115, which may occurrence between the mobile device 150 and one of the plurality of UWB sensors 120. The processes for evaluating spatial dependency 960 and temporal dependency 970 are graphically depicted.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A localization system for a mobile device, comprising:

a plurality of ultra-wideband (UWB) sensors affixed on a platform; and a controller, wherein the controller is communicatively coupled to the plurality of UWB sensors;

the controller having algorithmic code, wherein the algorithmic code is executable to:

determine a localization dataset between the plurality of UWB sensors and the mobile device;

execute an end-to-end machine learning-based localization routine based upon the localization dataset to determine a first location estimate for the mobile device;

execute a hybrid two-stage full-space localization routine based upon the localization dataset to determine a second location estimate for the mobile device;

determine a spatial location for the mobile device in relation to the controller based upon the first location estimate for the mobile device and the second location estimate for the mobile device; and control interaction between the mobile device and the platform via the controller, based upon a proximity of the mobile device to the platform, wherein the proximity is determined based upon one of the first location estimate and the second location estimate for the mobile device.

2. The localization system of claim 1, wherein the end-to-end machine learning-based localization routine includes:

a backbone encoder composed with a Siamese network to encode the localization dataset into a consistent feature map; and a feedforward layer arranged to determine the first location estimate for the mobile device based upon the consistent feature map.

3. The localization system of claim 2, further comprising employing the Siamese network to train the backbone encoder based upon a contrastive loss, wherein the contrastive loss is determined between a first scenario and a second scenario that are input to the Siamese network.

4. The localization system of claim 1, wherein the hybrid two-stage full-space localization routine includes a non-line of sight (NLOS) detection algorithm, a signal restoration algorithm, and a trilateration algorithm that are executable to determine the second location estimate for the mobile device.

5. The localization system of claim 4, wherein the hybrid two-stage full-space localization routine executes when the non-line of sight (NLOS) detection algorithm detects presence of an obstacle between one of the plurality of UWB sensors and the mobile device.

6. The localization system of claim 4, wherein the signal restoration algorithm includes a multi-variant signal restoration routine that is executable to generate a restored localization dataset based upon a spatial evaluation and a temporal evaluation of the localization dataset.

7. The localization system of claim 6, wherein the trilateration algorithm is executable to determine the second location estimate for the mobile device based upon the restored localization dataset.

8. The localization system of claim 6, wherein the hybrid two-stage full-space localization routine further includes a triangulation algorithm, wherein the triangulation algorithm is executable to determine the second location estimate for the mobile device based upon the restored localization dataset.

9. The localization system of claim 1, wherein the platform comprises a mobile platform.

10. A localization system for a mobile device, comprising:

a plurality of ultra-wideband (UWB) sensors affixed on a platform;

a controller, wherein the controller is communicatively coupled to the plurality of UWB sensors; and the controller having algorithmic code, wherein the algorithmic code is executable to:

determine a localization dataset between the mobile device and the plurality of UWB sensors;

execute a first localization routine to determine a first location estimate for the mobile device based upon the localization dataset;

execute a second localization routine to determine a second location estimate for the mobile device based upon the localization dataset, wherein the second localization routine includes a non-line of site (NLOS) detection routine, a signal restoration routine, and a trilateration algorithm that are executable to determine the second location estimate for the mobile device;

determine a spatial location for the mobile device in relation to the controller based upon the first location estimate for the mobile device and the second location estimate for the mobile device; and control interaction between the mobile device and the platform via the controller, based upon a proximity of the mobile device to the platform, wherein the proximity is determined based upon one of the first location estimate and the second location estimate for the mobile device.

11. The localization system of claim 10, wherein the first localization routine comprises an end-to-end machine learning-based localization routine, wherein the end-to-end machine learning-based localization routine determines the first location estimate for the mobile device based upon the localization dataset.

12. The localization system of claim 11, wherein the end-to-end machine learning-based localization routine includes:

a backbone encoder composed with a Siamese network to encode the localization dataset into a consistent feature map; and a feedforward layer arranged to determine the first location estimate for the mobile device based upon the consistent feature map.

13. The localization system of claim 12, further comprising employing the Siamese network to train the backbone encoder based upon a contrastive loss, wherein the contrastive loss is determined between a first scenario and a second scenario that are input to the Siamese network.

14. The localization system of claim 10, wherein the second localization routine comprises a hybrid two-stage full-space localization routine, wherein the hybrid two-stage full-space localization routine determines the second location estimate for the mobile device based upon the localization dataset.

15. The localization system of claim 14, wherein the hybrid two-stage full-space localization routine includes a non-line of sight (NLOS) detection algorithm, a signal restoration algorithm, a triangulation algorithm, and a trilateration algorithm that are executable to determine the second location estimate for the mobile device.

16. The localization system of claim 15, wherein the hybrid two-stage full-space localization routine executes when the non-line of sight (NLOS) detection algorithm detects presence of an obstacle between one of the plurality of UWB sensors and the mobile device.

17. The localization system of claim 15, wherein the signal restoration algorithm includes a multi-variant signal restoration routine that is executable to generate a restored localization dataset based upon a spatial evaluation and a temporal evaluation of the localization dataset.

18. The localization system of claim 17, wherein the trilateration algorithm and the triangulation algorithm are executable to determine the second location estimate for the mobile device based upon the restored localization dataset.

19. A localization system for a platform, comprising:

a plurality of ultra-wideband (UWB) sensors affixed on the platform;

a controller, wherein the controller is communicatively coupled to the plurality of UWB sensors; and algorithmic code, wherein the algorithmic code includes a first localization routine and a second localization routine;

wherein the controller is arranged to execute the algorithmic code;

wherein the algorithmic code is executable to:

determine a localization dataset between a mobile device and the plurality of UWB sensors;

execute the first localization routine to determine a first location estimate for the mobile device based upon the localization dataset;

execute the second localization routine to determine a second location estimate for the mobile device based upon the localization dataset, wherein the second localization routine includes a non-line of site (NLOS) detection routine, a signal restoration routine, and a trilateration algorithm that are executable to determine the second location estimate for the mobile device;

determine a spatial location for the mobile device on the platform; and control interaction between the mobile device and the platform via the controller, based upon a proximity of the mobile device to the platform, wherein the proximity is determined based upon one of the first location estimate and the second location estimate for the mobile device.

20. The localization system of claim 19, wherein the second localization routine comprises a hybrid two-stage full-space localization routine, wherein the hybrid two-stage full-space localization routine determines the second location estimate for the mobile device based upon the localization dataset;

wherein the hybrid two-stage full-space localization routine includes a non-line of sight (NLOS) detection algorithm, a signal restoration algorithm, a triangulation algorithm, and a trilateration algorithm that are executable to determine the second location estimate for the mobile device; and wherein the hybrid two-stage full-space localization routine executes when the non-line of sight (NLOS) detection algorithm detects presence of an obstacle between one of the plurality of UWB sensors and the mobile device.

* * * * *